(12) United States Patent
Thomas et al.

(10) Patent No.: US 11,551,674 B2
(45) Date of Patent: Jan. 10, 2023

(54) MULTI-PIPELINE LANGUAGE PROCESSING PLATFORM

(71) Applicant: Bank of America Corporation, Charlotte, NC (US)

(72) Inventors: Prejish Thomas, Plano, TX (US); Ravisha Andar, Plano, TX (US); Saahithi Chillara, Allen, TX (US); Emad Noorizadeh, Plano, TX (US); Priyank R. Shah, Plano, TX (US); Ramakrishna R. Yannam, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 116 days.

(21) Appl. No.: 16/996,106

(22) Filed: Aug. 18, 2020

(65) Prior Publication Data
US 2022/0059085 A1 Feb. 24, 2022

(51) Int. Cl.
| | |
|---|---|
| *G10L 15/18* | (2013.01) |
| *G10L 15/30* | (2013.01) |
| *G10L 13/00* | (2006.01) |
| *G10L 15/19* | (2013.01) |
| *G10L 15/00* | (2013.01) |
| *H04M 3/493* | (2006.01) |
| *G10L 15/22* | (2006.01) |

(52) U.S. Cl.
CPC .......... *G10L 15/1815* (2013.01); *G10L 13/00* (2013.01); *G10L 15/005* (2013.01); *G10L 15/19* (2013.01); *G10L 15/22* (2013.01); *G10L 15/30* (2013.01); *H04M 3/4936* (2013.01); *G10L 2015/223* (2013.01)

(58) Field of Classification Search
CPC ... G10L 15/1815; G10L 13/00; G10L 15/005; G10L 15/19; G10L 15/22; G10L 15/30; G10L 2015/223; H04M 3/4936
USPC .......................................................... 704/257
See application file for complete search history.

(56) References Cited

U.S. PATENT DOCUMENTS

| | | | | |
|---|---|---|---|---|
| 7,191,177 | B2* | 3/2007 | Konaka .............. | G06F 16/313 707/999.005 |
| 7,516,190 | B2* | 4/2009 | Kurganov ........... | G10L 15/08 704/270.1 |
| 7,599,837 | B2* | 10/2009 | Wang ................. | G10L 15/193 704/231 |
| 9,986,394 | B1* | 5/2018 | Taylor ................ | H04W 4/18 |
| 10,282,419 | B2* | 5/2019 | Hebert .............. | G06F 16/3344 |

(Continued)

*Primary Examiner* — Thuykhanh Le
(74) *Attorney, Agent, or Firm* — Weiss & Arons LLP

(57) ABSTRACT

Aspects of the disclosure relate to systems and methods for increasing the speed, accuracy, and efficiency of language processing systems. A provided method may include storing a plurality of distinct rule sets in a database. Each of the rule sets may be associated with a different pipeline from a set of pipelines. The method may include receiving the utterance. The method may include tokenizing and/or annotating the utterance, determining a pipeline for the utterance, and comparing the utterance to the rule set that is associated with the pipeline. When a match is achieved between the utterance and the rule set, the method may include resolving the intent of the utterance based on the match. The method may include transmitting a request corresponding to the intent to a central server, receiving a response, and transmitting the response to the system user.

15 Claims, 4 Drawing Sheets

(56) References Cited

U.S. PATENT DOCUMENTS

| | | | | |
|---|---|---|---|---|
| 10,387,456 B2* | 8/2019 | Moskwinski | | G06F 16/9024 |
| 11,250,876 B1* | 2/2022 | McCloskey | | G06N 20/10 |
| 11,308,281 B1* | 4/2022 | Craft | | G06F 40/284 |
| 2005/0125216 A1* | 6/2005 | Chitrapura | | G06F 40/30 |
| | | | | 704/1 |
| 2007/0112675 A1* | 5/2007 | Flinn | | G06Q 10/10 |
| | | | | 705/50 |
| 2008/0293427 A1* | 11/2008 | Quon | | H04M 7/0057 |
| | | | | 455/452.1 |
| 2010/0128042 A1* | 5/2010 | Confrey | | G06T 13/00 |
| | | | | 345/473 |
| 2010/0161313 A1* | 6/2010 | Karttunen | | G06F 40/289 |
| | | | | 704/9 |
| 2013/0297304 A1* | 11/2013 | Kim | | G10L 15/22 |
| | | | | 704/231 |
| 2014/0156567 A1* | 6/2014 | Scholtes | | G06N 5/02 |
| | | | | 706/12 |
| 2015/0212791 A1* | 7/2015 | Kumar | | G10L 15/22 |
| | | | | 715/728 |
| 2015/0228280 A1* | 8/2015 | Watanabe | | G10L 15/22 |
| | | | | 704/235 |
| 2016/0063994 A1* | 3/2016 | Skobeltsyn | | G10L 15/01 |
| | | | | 704/257 |
| 2016/0171978 A1* | 6/2016 | Xu | | G10L 15/1815 |
| | | | | 704/221 |
| 2017/0116557 A1* | 4/2017 | Apte | | G06F 16/3344 |
| 2017/0336933 A1* | 11/2017 | Hassel | | G06F 3/167 |
| 2018/0336905 A1* | 11/2018 | Kim | | G10L 17/22 |
| 2019/0147044 A1* | 5/2019 | Bangalore | | G06F 40/137 |
| | | | | 704/257 |
| 2019/0171414 A1* | 6/2019 | Zomet | | G06F 16/957 |
| 2020/0074991 A1* | 3/2020 | Yalla | | G06F 40/268 |
| 2020/0175986 A1* | 6/2020 | Jones | | G10L 15/1815 |
| 2020/0184957 A1* | 6/2020 | Asumu | | G06N 20/00 |
| 2020/0227032 A1* | 7/2020 | Toplyn | | G06F 40/56 |
| 2020/0257717 A1* | 8/2020 | Li | | G06F 40/211 |
| 2020/0258508 A1* | 8/2020 | Aggarwal | | G01C 21/3608 |
| 2020/0342032 A1* | 10/2020 | Subramaniam | | G10L 15/063 |
| 2020/0344185 A1* | 10/2020 | Singaraju | | G06F 16/9024 |
| 2020/0349943 A1* | 11/2020 | Elangovan | | G10L 15/22 |
| 2020/0394333 A1* | 12/2020 | Norgeot | | G06F 40/284 |
| 2021/0027771 A1* | 1/2021 | Hall | | G06F 16/3344 |
| 2021/0034816 A1* | 2/2021 | Lall | | G06F 40/279 |
| 2021/0056099 A1* | 2/2021 | Goodsitt | | G06F 16/35 |
| 2021/0081615 A1* | 3/2021 | McRitchie | | G06F 40/247 |
| 2021/0081819 A1* | 3/2021 | Polleri | | G06F 16/252 |
| 2021/0081848 A1* | 3/2021 | Polleri | | G06F 8/77 |
| 2021/0089587 A1* | 3/2021 | Gupta | | G06F 40/30 |
| 2021/0160242 A1* | 5/2021 | McKnight | | G06Q 10/1091 |
| 2021/0200515 A1* | 7/2021 | Rayapati | | G06N 20/20 |
| 2021/0216720 A1* | 7/2021 | Rao | | G06F 40/35 |

\* cited by examiner

MULTI-PIPELINE LANGUAGE PROCESSING PLATFORM

FIELD OF TECHNOLOGY

Aspects of the disclosure relate to computer systems. Specifically, aspects of the disclosure relate to computerized language processing systems.

BACKGROUND OF THE DISCLOSURE

Language processing systems are useful for processing spoken utterances and resolving the intent of the speaker of the utterance. Once resolved, a computer system may be able to respond appropriately to a request of the speaker when a request is included or implicated in the intent of the speaker.

Conventional language processing systems, however, often suffer from speed, accuracy, and efficiency deficiencies. It may be difficult for the conventional systems to quickly disambiguate the utterance. This difficulty may cause the system to produce slow and/or inaccurate results. For example, if the word "apple" is a part of the utterance, the system may not be able to quickly determine if the intent is for the fruit or a company of the same name. Conventional systems may make an incorrect assumption. Conventional systems may take processing time to achieve an accurate result. Conventional systems may engage in time-consuming queries to the speaker to disambiguate the utterance and achieve an accurate result.

It would be desirable, therefore, to provide systems and methods for increasing the speed, accuracy, and efficiency of language processing systems.

SUMMARY OF THE DISCLOSURE

Aspects of the disclosure relate to a multi-pipeline digital platform with increased processing speed, accuracy, and efficiency for resolving an intent of an utterance. The platform may include a processor. The platform may include a database storing a plurality of distinct rule sets. Each of the rule sets may include a set of regular expression patterns. Each of the rule sets may be associated with a different pipeline from a set of pipelines. The platform may include a non-transitory memory storing a set of computer-executable instructions. When run on the processor, the instructions may perform some or all platform functionality.

The platform may be configured to receive the utterance. The utterance may include a string of words spoken by a system user. The string of words may include a user request. The platform may be configured to tokenize the utterance via a natural language processing (NLP) engine. The platform may be configured to annotate the utterance via the NLP engine. The platform may be configured to determine a pipeline from the set of pipelines that is associated with the utterance. The platform may be configured to compare the utterance to the rule set that is associated with the determined pipeline.

When a match is achieved between the utterance and a regular expression pattern from the rule set that is associated with the determined pipeline, the platform may be configured to resolve the intent of the utterance based on the match. The resolved intent may correspond to the user request. The platform may be configured to transmit the user request to a central server. The platform may be configured to receive a response to the user request from the central server, and transmit the response to the system user.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
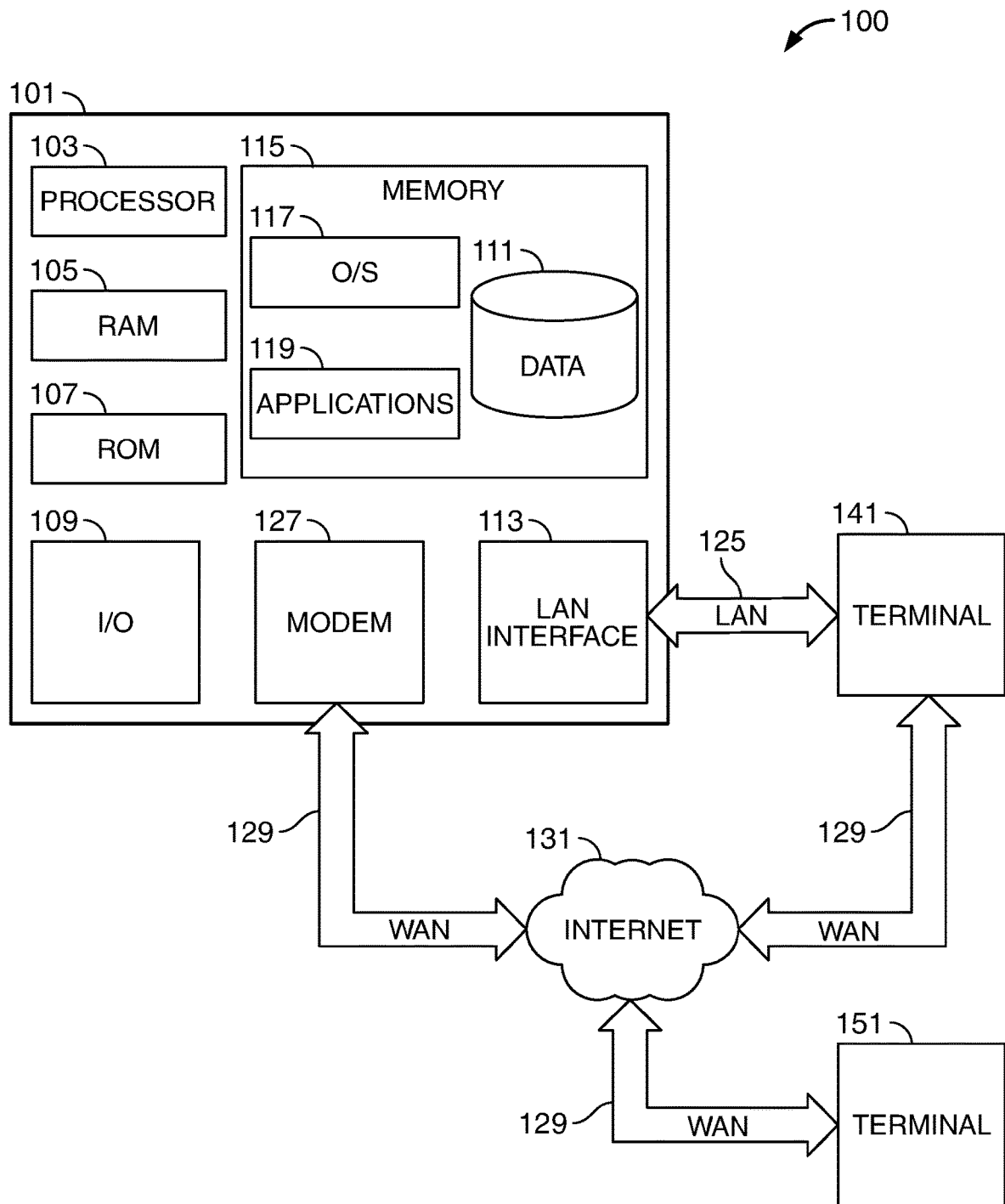
FIG. 1 shows an illustrative system in accordance with principles of the disclosure.

Aspects of the disclosure relate to systems and methods for increasing the speed, accuracy, and efficiency of language processing systems.

A multi-pipeline digital platform with increased processing speed, accuracy, and efficiency for resolving an intent of an utterance is provided. The platform may include a processor. The platform may include a non-transitory memory storing a set of computer-executable instructions. When run on the processor, the instructions may perform some or all platform functionality.

The platform may include a database storing a plurality of distinct rule sets. Each of the rule sets may include a set of regular expression patterns. A regular expression pattern (which may alternatively be referred to herein as a "regex" pattern) may define a sequence of units that may be used as part of a search pattern. Each unit may define one or more words that may satisfy the unit. A phrase that matches the sequence of units may trigger a predefined response from the system.

For example, an illustrative regex pattern in a language processing system may be "([/what|how/] [/is/] [/the/] [/weather/)." The phrases "What is the weather" and "How is the weather" may both satisfy this regex, due to the vertical bar in the first unit which may denote alternative possibilities. A system may be preprogrammed to respond with a weather report to a user who speaks one of these phrases.

Each of the rule sets may be associated with a different pipeline from a set of pipelines. A pipeline may be a routing mechanism for each utterance. Each pipeline may represent a different category or subject with which an utterance may be associated. For example, in one illustrative embodiment of the platform implemented in a financial services context, one pipeline may be for utterances associated with transaction inquiries/requests, and another pipeline may be for utterances associated with investment inquiries/requests. Providing a distinct rule set for each pipeline may decrease the need to disambiguate an utterance, and thereby increase the speed, accuracy, and efficiency of the language processing system.

The platform may be configured to receive an utterance. The utterance may include a string of words spoken by a system user. In some embodiments, the utterance may be a string of words typed, written, or otherwise generated by the user. The string of words may include a user request. The platform may, in certain embodiments, receive the request via the user speaking into a telephonic system or a computer application.

The platform may be configured to tokenize the utterance via a natural language processing (NLP) engine. The platform may be configured to annotate the utterance via the NLP engine. Tokenizing and/or annotating the utterance may include breaking the utterance into words or phrases, and labeling the words/phrases with metadata such as parts-of-speech labels.

by the system as a noun may include a word that is a part of speech other than a noun but is used in a portion of the utterance that is associated with being a noun. For example, the word may be a verb that is used in the sentence structure of the utterance as a noun, and the system may label the word as a noun, and by extension, a stock name.

In some embodiments, the set of regular expression patterns of one of the rule sets may include one, some, or all of the regex patterns below. These illustrative regex patterns may match requests that may typically be received within a certain pipeline, such as an investment request pipeline.

```
([/range|quote|close|open/] [/for|of/]?) (?$StockName[{tag:/NN.*|FW/}]{1,4});
([/reports|price/] [/range/]? [/for|of/]?) (?$StockName[{tag:/NN.*|FW/}]{1,4});
([/sector/] [/for|to/]?) (?$StockName[{tag:/NN.*|FW/}]{1,4});
([/52-week/] [/range/] [/for|of/]?) (?$StockName[{tag:/NN.*|FW/}]{1,4});
([/analysts/]) (?$StockName[{tag:/NN.*|FW|VBP/}]{1,4});
([/nav/]) (?$StockName[{tag:/NN.*|FW|VBP/}]{1,4});
([/peers|volumes|esg|analysts|articles|beta|coverage|dividend|earnings|eps|nav|news|fundamen
tals|chart|chain/] [/for|to|of/]?) (?$StockName[{tag:/NN.*|FW|VBP/}]{1,4});
([/cfra|lipper|morningstar/]? [/rating|ratings/] [/for|to|of/]?)
(?$StockName[{tag:/NN.*|FW/}]{1,4});
([/day[day's/] [/'s/]? [/high|low|change/] [/for|to|of/]?)
(?$StockName[{tag:/NN.*|FW/}]{1,4});
([/market/]? [/cap/] [/for|to|of/]?) (?$StockName[{tag:/NN.*|FW/}]{1,4});
([/price/] [/objective/] [/for|to|of/]?) (?$StockName[{tag:/NN.*|FW/}]{1,4});
([/news/] [/wire/]? [/for|to|of/]?) (?$StockName[{tag:/NN.*|FW/}]{1,4});
([/expense|price|p\/e/] [/ratio/]? [/for|to|of/]?) (?$StockName[{tag:/NN.*|FW/}]{1,4});
([/earnings/] [/per/]? [/share/]? [/for|to|of/]?) (?$StockName[{tag:/NN.*|FW/}]{1,4});
([/fund/] [/inception/] [/date/] [/for|to|of/]?) (?$StockName[{tag:/NN.*|FW/}]{1,4});
([/carbon/] [/footprint/] [/for|to|of/]?) (?$StockName[{tag:/NN.*|FW/}]{1,4});
([/net/] [/asset/] [/value/] [/for|to|of/]?) (?$StockName[{tag:/NN.*|FW/}]{1,4});
(?$StockName[{tag:/NN.*|FW/}]{1,4}) ([/quote|chart|trends|doing/]);
(?$StockName[{tag:/NN.*|FW/}]{1,4}) ([/stock|fund/] [/story/]?);
([/stock|fund|quote|chart|trends|impact/] [/for|to|of/]?)
(?$StockName[{tag:/NN.*|FW/}]{1,4}); and
([/sell|buy|add|remove|short/] [/for|to|of/]?) (?$StockName[{tag:/NN.*|FW/}]{1,4}).
```

The platform may be configured to determine a pipeline from the set of pipelines that is associated with the utterance. The determination may be based on the existence of certain predetermined keywords. The determination may include a regex search. The determination may be based at least in part on a selection of the user or a telephone number or computer application link with which the user entered the utterance.

As an illustrative example, the platform may determine that the utterance is a request that relates to investments. This determination may, in this scenario, have been made based on the word "investment" being part of the utterance. The platform may route the utterance to an investment request pipeline. The investment request pipeline may be associated with a distinct rule set. The distinct rule set may be tailored to investment related requests, thereby increasing the speed, accuracy, and efficiency of the system.

The platform may be configured to compare the utterance to the rule set that is associated with the determined pipeline. When a match is achieved between the utterance and a regular expression pattern from the rule set that is associated with the determined pipeline, the platform may be configured to resolve the intent of the utterance based on the match. The resolved intent may correspond to the user request. The platform may be configured to transmit the user request to a central server. The platform may be configured to receive a response to the user request from the central server, and transmit the response to the system user.

In certain embodiments, one of the rule sets may include a rule for identifying stock names. The rule may include identifying a word from the utterance that is identified by the system as a noun as a stock name. A word that is identified NN may refer to a word that is associated with being a noun. FW may refer to a foreign word. A foreign word may be a word that is recognized as a word from a foreign language, or, in certain embodiments, a word that is not recognized by the system. VBP may refer to a singular verb in present tense.

Some embodiments may further include an automated telephonic system. The utterance may be received via the system user calling in on a telephone to the automated telephonic system. In certain embodiments the utterance may be received via the system user speaking into a microphone of a device running a computer application. In some embodiments, such as when the user is calling in on a telephone, the response may be converted into an audible response that is transmitted by the automated telephonic system to the telephone. In some embodiments, the utterance may be received via text, through, for example, a computer messaging or short messaging service (SMS) application.

In certain embodiments, when a match is not achieved as a result of the comparison, the platform may be further configured to perform a disambiguation. A disambiguation may include transmitting a query to the system user to make a pipeline selection. The selection may be of a pipeline that is different from the pipeline originally determined by the platform.

Some embodiments may include a hierarchical multi-tier pipeline architecture. The multi-tier pipeline architecture may include at least three tiers. The first tier may include a first pipeline. Each subsequent tier may include one or more pipelines that are each linked to one pipeline of a tier one level up in the architecture. The rule set associated with each pipeline may include all of the rule sets associated with all the pipelines of lower tiers that are linked, directly or indirectly, to that pipeline.

For example, in an illustrative example of a financial services system, the first-tier pipeline may include all financial services. The second tier may include a pipeline for investment requests and another pipeline for transaction requests. The third tier may include multiple pipelines that are each a subcategory of either an investment request or a transaction request (i.e., a more specific type, such as a request relating to a specific investment account). Each pipeline of the third tier may include a rule set closely tailored to that subcategory. The pipelines of the second tier may each include all the rule sets that are associated with the pipelines of the subcategories of that second-tier pipeline (e.g., the second-tier investment request pipeline may include all the rule sets of the more specific investment pipelines of the third tier). The pipeline of the first tier may include all the rule sets of the lower tiers.

A method is provided for resolving an intent of an utterance with increased processing speed, accuracy, and efficiency. The method may be executed via a set of computer-executable instructions stored in a non-transitory memory and run on a processor. The method may include: storing a plurality of distinct rule sets in a database, each of the rule sets comprising a set of regular expression patterns, and each of the rule sets associated with a different pipeline from a set of pipelines; receiving the utterance, said utterance comprising a string of words spoken by a system user, said string of words comprising a user request; tokenizing the utterance via a natural language processing (NLP) engine; annotating the utterance via the NLP engine; determining a pipeline from the set of pipelines that is associated with the utterance; comparing the utterance to the rule set that is associated with the determined pipeline; when a match is achieved between the utterance and a regular expression pattern from the rule set that is associated with the determined pipeline, resolving the intent of the utterance based on the match, said resolved intent corresponding to the user request; transmitting the user request to a central server; receiving a response to the user request from the central server; and/or transmitting the response to the system user.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to language processing. The input/output module may also include one or more speakers for providing audio output and a video display device for providing textual, audio, audiovisual, and/or graphical output. The input and output may be related to computer application functionality. The input and output may be related to user requests from a system.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to language processing of user requests.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
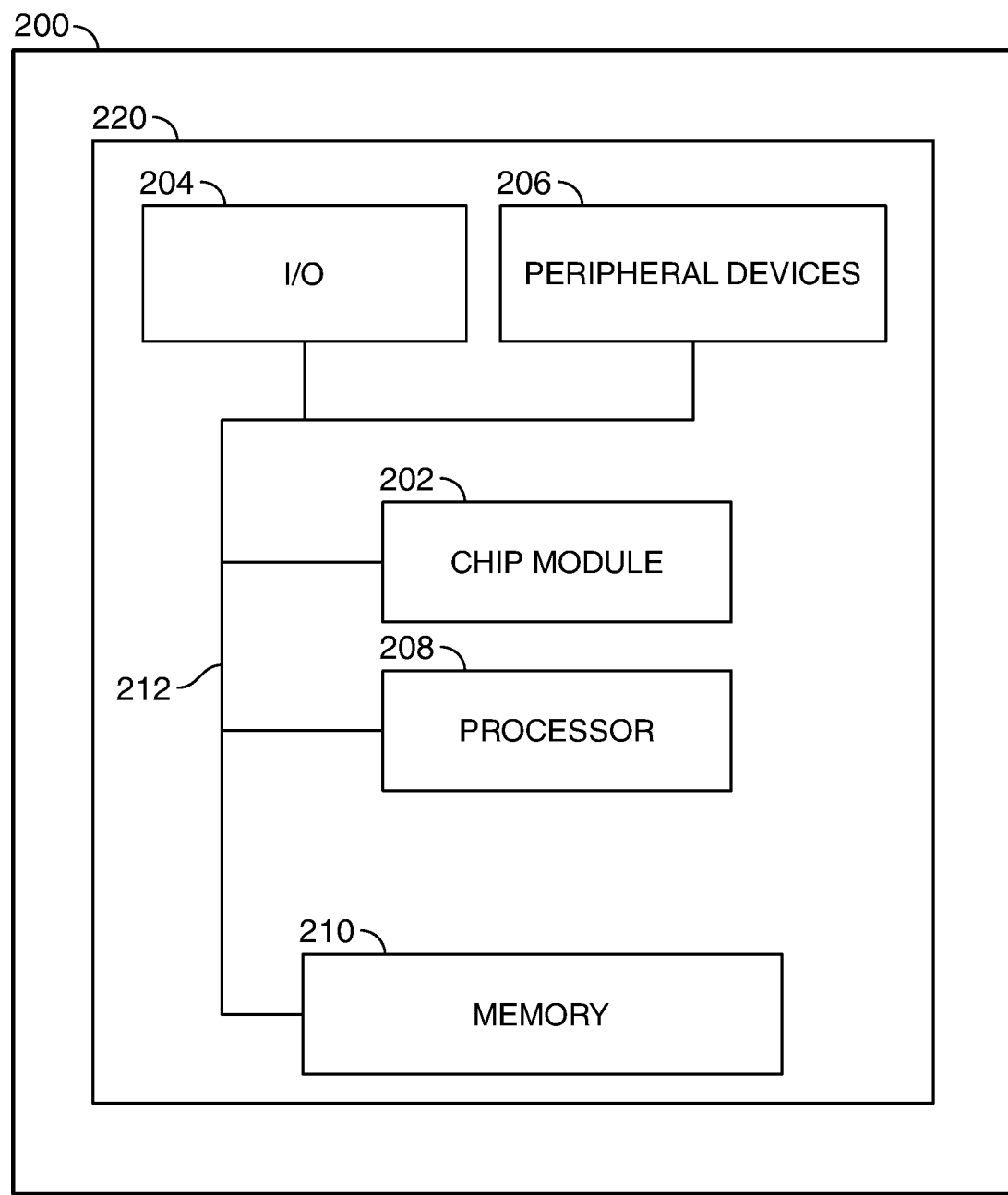
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
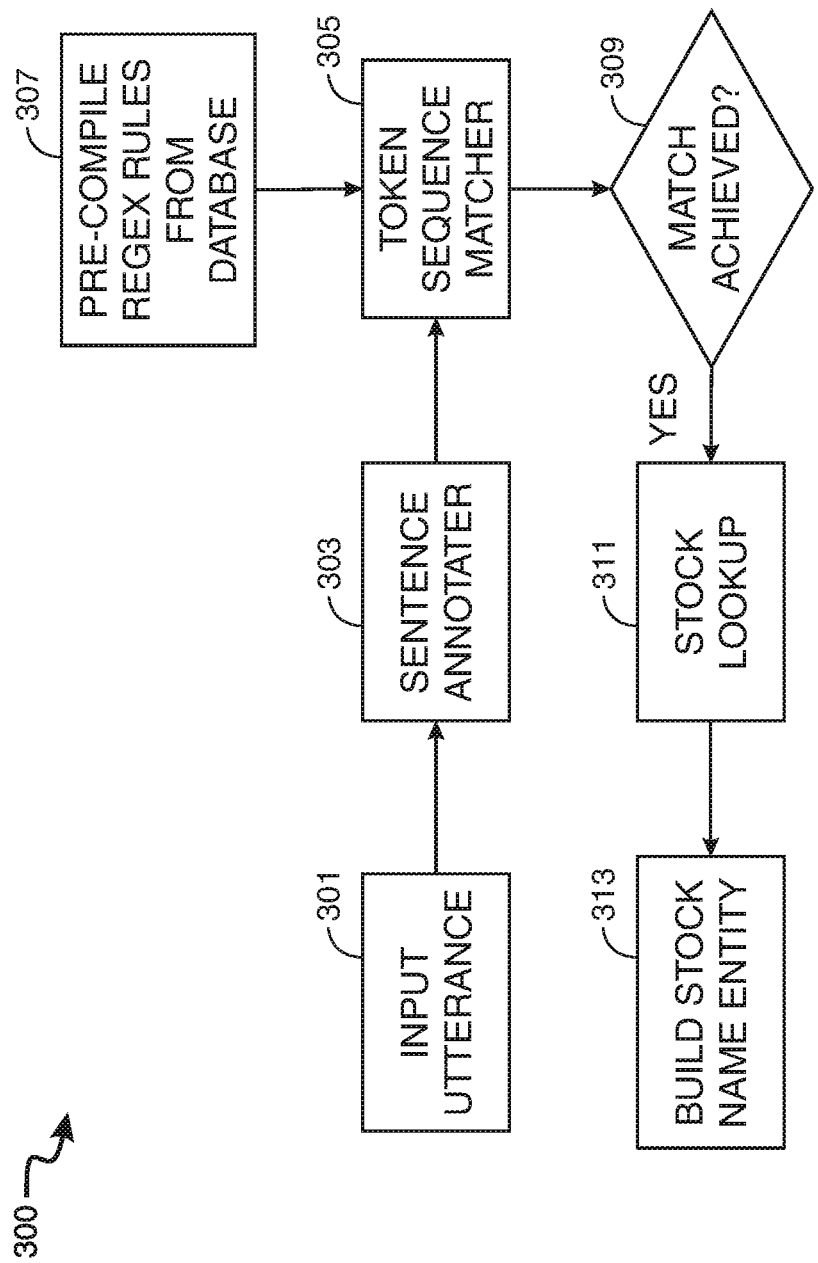
FIG. 3 shows an illustrative flowchart in accordance with principles of the disclosure.

FIG. 3 shows illustrative flowchart 300 in accordance with principles of the disclosure. Flowchart 300 shows receipt of an input utterance at 301. The system may annotate and/or tokenize the utterance at 303. The system may match token sequences at 305 at least in part based on 307, precompiled regular expression ("regex") rules from a database. If a match is achieved at 309, the system may identify a stock name and look up the stock name at 311. The system may build a stock name entity at 313. Building a stock name entity may include compiling information about the stock for use in responding to the user request extracted from the utterance.

Figure 4:
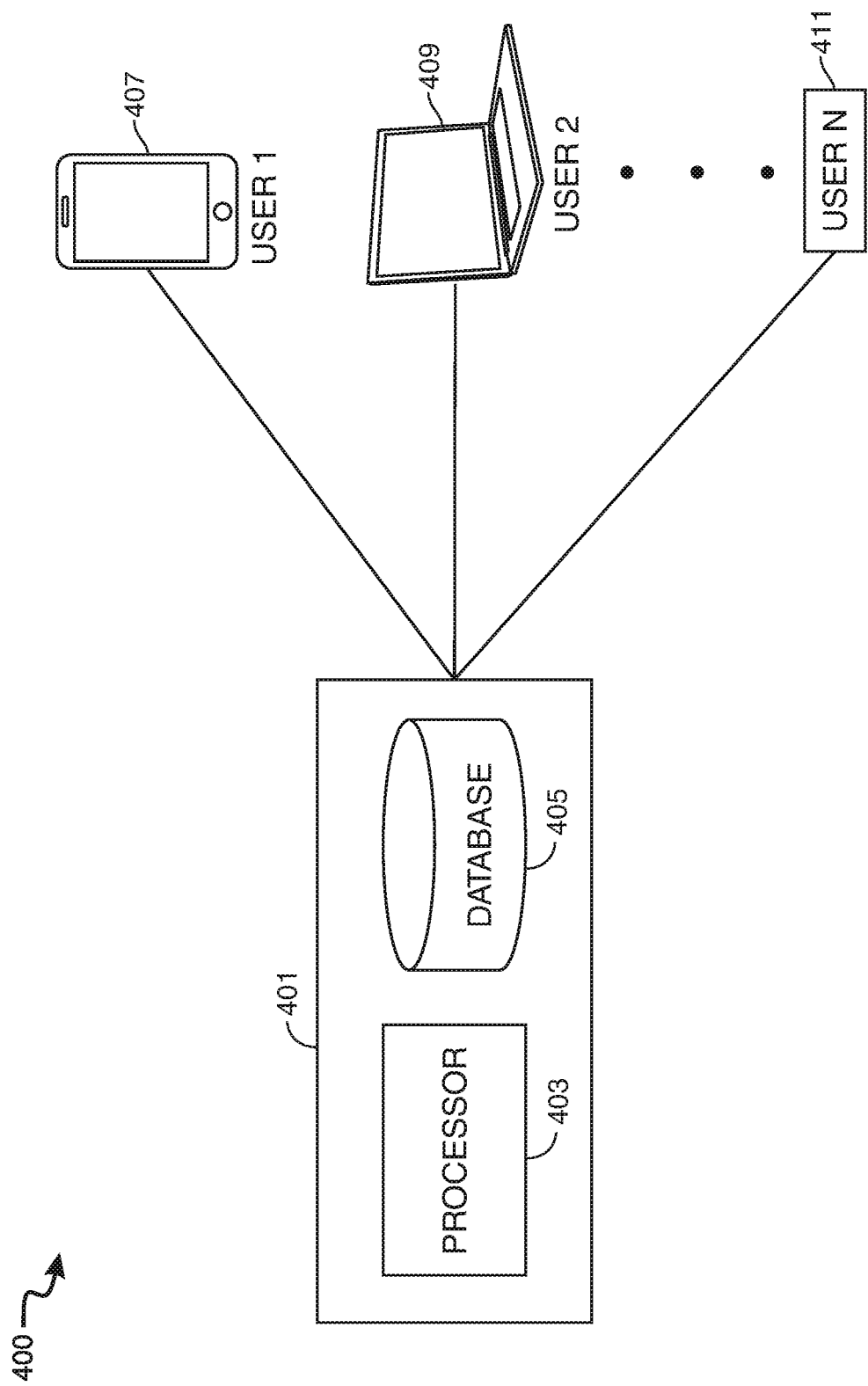
FIG. 4 shows an illustrative system diagram in accordance with principles of the disclosure.

FIG. 4 shows illustrative system diagram 400 in accordance with principles of the disclosure. Diagram 400 includes platform 401. Platform 401 may include processor 403 and database 405. Processor 403 may include, or be linked to, machine learning and/or language processing engines. Database 405 may include regular expression pattern sets that may be associated with various pipelines. Platform 401 may be linked to user devices 407-411. Illustrative user devices may include telephones and computing devices.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for a multi-pipeline language processing platform are provided. Persons skilled in the art will appreciate that the present invention can be practiced by other than the described embodiments, which are presented for purposes of illustration rather than of limitation, and that the present invention is limited only by the claims that follow.

What is claimed is:

1. A multi-pipeline digital platform with increased processing speed, accuracy, and efficiency for resolving an intent of an utterance, said platform comprising:
a processor;
a database storing a plurality of distinct rule sets, each of the rule sets comprising a set of regular expression patterns, and each of the rule sets associated with a different pipeline from a set of pipelines; and
a non-transitory memory storing a set of computer-executable instructions, that, when run on the processor, are configured to:
receive the utterance, said utterance comprising a string of words spoken by a system user, said string of words comprising a user request;
tokenize the utterance via a natural language processing (NLP) engine;
annotate the utterance via the NLP engine;
determine a pipeline from the set of pipelines that is associated with the utterance;
compare the utterance to the rule set that is associated with the determined pipeline;
when a match is achieved between the utterance and a regular expression pattern from the rule set that is associated with the determined pipeline, resolve the intent of the utterance based on the match, said resolved intent corresponding to the user request;
transmit the user request to a central server;
receive a response to the user request from the central server; and
transmit the response to the system user;
wherein the set of regular expression patterns of one of the rule sets comprises:
a first rule comprising a first regular expression pattern ([/range|quote|close|open/] [/for|of/]?) followed by a regular expression pattern identifying a word as a stock name based at least in part on the word satisfying identifiers NN and FW, wherein said first regular expression pattern is satisfied by an utterance comprising "range," "quote," "close," or "open" followed by "for" or "of";
a second rule comprising a second regular expression pattern ([/reports|price/] [/range/]? [/for|of/]?) followed by a regular expression pattern identifying a word as a stock name based at least in part on the word satisfying identifiers NN and FW, wherein said second regular expression pattern is satisfied by an utterance comprising "reports" or "price" followed by "range" followed by "for" or "of";
a third rule comprising a third regular expression pattern ([/sector/] [/for|to/]?) followed by a regular expression pattern identifying a word as a stock name based at least in part on the word satisfying identifiers NN and FW, wherein said third regular expression pattern is satisfied by an utterance comprising "sector" followed by "for" or "to";
a fourth rule comprising a fourth regular expression pattern ([/52-week/] [/range/] [/for|of/]?) followed by a regular expression pattern identifying a word as a stock name based at least in part on the word satisfying identifiers NN and FW, wherein said fourth regular expression pattern is satisfied by an utterance comprising "52-week" followed by "range" followed by "for" or "of";
a fifth rule comprising a fifth regular expression pattern ([/analysts/]) followed by a regular expression pattern identifying a word as a stock name based at least in part on the word satisfying identifiers NN and FW, wherein said fifth regular expression pattern is satisfied by an utterance comprising "analysts";
a sixth rule comprising a sixth regular expression pattern ([/nav/]) followed by a regular expression pattern identifying a word as a stock name based at least in part on the word satisfying identifiers NN and FW, wherein said sixth regular expression pattern is satisfied by an utterance comprising "nay";
a seventh rule comprising a seventh regular expression pattern ([/peers|volume|esg|analysts|articles|beta|coverage|dividend|earnings|eps|nav|news|fundamentals|chart|chain/] [/for|to|of/]?) followed by a regular expression pattern identifying a word as a stock name based at least in part on the word satisfying identifiers NN and FW, wherein said seventh regular expression pattern is satisfied by an utterance comprising "peers," "volume," "esg," "analysts," "articles," "beta," "coverage," "dividend," "earnings," "eps," "nav," "news," "fundamentals," "chart," or "chain" followed by "for" or "to" or "of";
an eighth rule comprising an eighth regular expression pattern ([/cfra|lipper|morningstar/]? [/rating|ratings/] [/for|to|of/]?) followed by a regular expression pattern identifying a word as a stock name based at least in part on the word satisfying identifiers NN and FW, wherein said eighth regular expression pattern is satisfied by an utterance comprising "cfra," "lipper," or "morningstar" followed by "rating" or "ratings" followed by "for" or "to" or "of";
a ninth rule comprising a ninth regular expression pattern ([/day|day's/] [/'s/]? ([/high|low|changed/] [/for|to|of/]?) followed by a regular expression pattern identifying a word as a stock name based at least in part on the word satisfying identifiers NN and FW, wherein said ninth regular expression pattern is satisfied by an utterance comprising "day" or "day's"followed by s" followed by "high," "low", or "change" followed by "tor" or "to" or "of";
a tenth rule comprising a tenth regular expression pattern ([/market/]? [/cap/] [/for|to|of/]?) followed by a regular expression pattern identifying a word as a stock name based at least in part on the word satisfying identifiers NN and FW, wherein said tenth regular expression pattern is satisfied by an utterance comprising "market" followed by "cap" followed by "for" or "to" or "of";
an eleventh rule comprising an eleventh regular expression pattern ([/price/] [/objective/] [/for|to|of/]?) followed by a regular expression pattern identifying a word as a stock name based at least in part on the word satisfying identifiers NN and FW, wherein said eleventh regular expression pattern is satisfied by an utterance comprising "price" followed by "objective" followed by "for" or "to" or "of";
a twelfth rule comprising a twelfth regular expression pattern ([/news/] [/wire/]? [/for|to|of/]?) followed by a regular expression pattern identifying a word as a stock name based at least in part on the word satisfying identifiers NN and FW, wherein said twelfth regular expression pattern is satisfied by an utterance comprising "news" followed by "wire" followed by "for" or "to" or "of";
a thirteenth rule comprising a thirteenth regular expression pattern ([/expense|price|pVe/] [/ratio/]? [/for|to|of/]?) followed by a regular expression pattern identifying a word as a stock name based at least in part on the word satisfying identifiers NN and FW, wherein said thirteenth regular expression pattern is satisfied by an utterance comprising "expense," "price," or "p/e" followed by "ratio" followed by "for" or "to" or "of";
a fourteenth rule comprising a fourteenth regular expression pattern ([/earnings/] [/per/]? [/share/]? [/for|to|of/]?) followed by a regular expression pattern identifying a word as a stock name based at least in part on the word satisfying identifiers NN and FW, wherein said fourteenth regular expression pattern is satisfied by an utterance comprising "earnings" followed by "per" followed by "share" followed by "for" or "to" or "of";

a fifteenth rule comprising a fifteenth regular expression pattern ([/fund/] [/inception/] [/date/] [/for|to|of/]?) followed by a regular expression pattern identifying a word as a stock name based at least in part on the word satisfying identifiers NN and FW, wherein said fifteenth regular expression pattern is satisfied by an utterance comprising "fund" followed by "inception" followed by "date" followed by "for" or "to" or "of";

a sixteenth rule comprising a sixteenth regular expression pattern ([/carbon/] [/footprint/] [/for|to|of/]?) followed by a regular expression pattern identifying a word as a stock name based at least in part on the word satisfying identifiers NN and FW, wherein said sixteenth regular expression pattern is satisfied by an utterance comprising "carbon" followed by "footprint" followed by "for" or "to" or "of";

a seventeenth rule comprising a seventeenth regular expression pattern ([/net/] [/asset/] [/value/] [/for|to|of/]?) followed by a regular expression pattern identifying a word as a stock name based at least in part on the word satisfying identifiers NN and FW, wherein said seventeenth regular expression pattern is satisfied by an utterance comprising "net" followed by "asset" followed by "value" followed by "for" or "to" or "of";

an eighteenth rule comprising an eighteenth regular expression pattern ([quote|chart|trends|doing/]) preceded by a regular expression pattern identifying a word as a stock name based at least in part on the word satisfying identifiers NN and FW, wherein said eighteenth regular expression pattern is satisfied by an utterance comprising "quote," "chart," "trend," or "doing";

a nineteenth rule comprising a nineteenth regular expression pattern ([/stock|fund/] [/story/]?) preceded by a regular expression pattern identifying a word as a stock name based at least in part on the word satisfying identifiers NN and FW, wherein said nineteenth regular expression pattern is satisfied by an utterance comprising "stock" or "fund" followed by "story";

a twentieth rule comprising a twentieth regular expression pattern ([/stock|fund|quote|chart|trends|impact/] [/for|to|of/]?) followed by a regular expression pattern identifying a word as a stock name based at least in part on the word satisfying identifiers NN and FW, wherein said twentieth regular expression pattern is satisfied by an utterance comprising "stock," "fund," "quote," "chart," "trends," or "impact" followed by for" or "to" or "of"; and a twenty first rule comprising a twenty first regular expression pattern ([/sell|buy|add|remove|short/] [/for|to|of/]?) followed by a regular expression pattern identifying a word as a stock name based at least in part on the word satisfying identifiers NN and FW, wherein said twenty first regular expression pattern is satisfied by an utterance comprising "sell," "buy," "add," "remove," or "short" followed by "for" or "to" or "of"; and wherein:
  NN refers to a word that is associated with being a noun; and
  FW refers to a foreign word, said foreign word being a word that is not recognized as a word that is part of a native language of the platform.

2. The platform of claim 1, wherein one of the pipelines in the set of pipelines is associated with investment requests.

3. The platform of claim 1, wherein one of the rule sets comprises a rule for identifying stock names, and said rule comprises identifying a word from the utterance that is a noun as a stock name, wherein a word that is a noun includes a word that is a part of speech other than a noun but is used in a portion of the utterance that is associated with being a noun.

4. The platform of claim 1, further comprising an automated telephonic system, wherein the utterance is received via the system user calling in on a telephone to the automated telephonic system, and the response is converted into an audible response that is transmitted by the automated telephonic system to the telephone.

5. The platform of claim 1, wherein, when a match is not achieved as a result of the comparison, the platform is further configured to perform a disambiguation, said disambiguation comprising transmitting a query to the system user to make a pipeline selection that is different from the pipeline determined by the platform.

6. The platform of claim 1, further comprising a hierarchical multi-tier pipeline architecture, said multi-tier pipeline architecture comprising at least three tiers, wherein the first tier comprises a first pipeline, and each subsequent tier comprises one or more pipelines that are each linked to one pipeline of a tier one level up in the architecture, and wherein the rule set associated with each pipeline comprises all of the rule sets associated with all the pipelines of lower tiers that are linked, directly or indirectly, to said each pipeline.

7. A method for resolving an intent of an utterance with increased processing speed, accuracy, and efficiency, said method executed via a set of computer-executable instructions stored in a non-transitory memory and run on a processor, said method comprising:
  storing a plurality of distinct rule sets in a database, each of the rule sets comprising a set of regular expression patterns, and each of the rule sets associated with a different pipeline from a set of pipelines;
  receiving the utterance, said utterance comprising a string of words spoken by a system user, said string of words comprising a user request;
  tokenizing the utterance via a natural language processing (NLP) engine;
  annotating the utterance via the NLP engine;
  determining a pipeline from the set of pipelines that is associated with the utterance;
  comparing the utterance to the rule set that is associated with the determined pipeline;
  when a match is achieved between the utterance and a regular expression pattern from the rule set that is associated with the determined pipeline, resolving the intent of the utterance based on the match, said resolved intent corresponding to the user request;
  transmitting the user request to a central server;
  receiving a response to the user request from the central server; and
  transmitting the response to the system user;
wherein one of the rule sets comprises:
a first rule comprising a first regular expression pattern ([/range|quote|close|opend/ ] [/for|of/]?) followed by a regular expression pattern identifying a word as a stock name based at least in part on the word satisfying identifiers NN and FW, wherein said first regular expression pattern is satisfied by an utterance comprising "range," "quote," "close," or "open" followed by "for" or "of";
a second rule comprising a second regular expression pattern ([/reports|price/] [/range/]? [/for|of/]?) followed by a regular expression pattern identifying a word as a stock name based at least in part on the word satisfying identifiers NN and FW, wherein said second regular expression pattern is satisfied by an utterance comprising "reports" or "price" followed by "range" followed by "for" or "of";

a third rule comprising a third regular expression pattern ([/sector/] [/for|to/]?) followed by a regular expression pattern identifying a word as a stock name based at least in part on the word satisfying identifiers NN and FW, wherein said third regular expression pattern is satisfied by an utterance comprising "sector" followed by "for" or "to";

a fourth rule comprising a fourth regular expression pattern ([/52-week/] [/range/] [/for|of/]?) followed by a regular expression pattern identifying a word as a stock name based at least in part on the word satisfying identifiers NN and FW, wherein said fourth regular expression pattern is satisfied by an utterance comprising "52-week" followed by "range" followed by "for" or "of";

a fifth rule comprising a fifth regular expression pattern ([/analysts/]) followed by a regular expression pattern identifying a word as a stock name based at least in part on the word satisfying identifiers NN and FW, wherein said fifth regular expression pattern is satisfied by an utterance comprising "analysts";

a sixth rule comprising a sixth regular expression pattern ([/nav/]) followed by a regular expression pattern identifying a word as a stock name based at least in part on the word satisfying identifiers NN and FW, wherein said sixth regular expression pattern is satisfied by an utterance comprising "nav";

a seventh rule comprising a seventh regular expression pattern ([/peers|volume|esg|analysts|articles|beta|coverage-|dividend|earnings|eps|nav|news|fundamentals|chart-|chain/] [/for|to|of/]?) followed by a regular expression pattern identifying a word as a stock name based at least in part on the word satisfying identifiers NN and FW, wherein said seventh regular expression pattern is satisfied by an utterance comprising "peers," "volume," "esg," "analysts," "articles," "beta," "coverage," "dividend," "earnings," "eps," "nav," "news," "fundamentals," "chart," or "chain" followed by "for" or "to" or "of";

an eighth rule comprising an eighth regular expression pattern ([cfra|lipper|morningstar/]? [/rating|ratings/] [/for-|to|of/]?) followed by a regular expression pattern identifying a word as a stock name based at least in part on the word satisfying identifiers NN and FW, wherein said eighth regular expression pattern is satisfied by an utterance comprising "cfra," "lipper," or "morningstar" followed by "rating" or "ratings" followed by "for" or "to" or "of";

a ninth rule comprising a ninth regular expression pattern ([/day|day's/] [/'s/]? [/high|low|change/] [for|to|of/]?) followed by a regular expression pattern identifying a word as a stock name based at least in part on the word satisfying identifiers NN and FW, wherein said ninth regular expression pattern is satisfied by an utterance comprising "day" or "day's" followed by "'s" followed by "high," "low," or "change" followed by "for" or "to" or "of";

a tenth rule comprising a tenth regular expression pattern ([/market/]? [/cap/] [/for|to|of/]?) followed by a regular expression pattern identifying a word as a stock name based at least in part on the word satisfying identifiers NN and FW, wherein said tenth regular expression pattern is satisfied by an utterance comprising "market" followed by "cap" followed by "for" or "to" or "of";

an eleventh rule comprising an eleventh regular expression pattern ([/price/] [/objective/] [/for|to|of/]?) followed by a regular expression pattern identifying a word as a stock name based at least in part on the word satisfying identifiers NN and FW, wherein said eleventh regular expression pattern is satisfied by an utterance comprising "price" followed by "objective" followed by "for" or "to" or "of";

a twelfth rule comprising a twelfth regular expression pattern ([/news/] [/wire/]? [/for|to|of/]?) followed by a regular expression pattern identifying a word as a stock name based at least in part on the word satisfying identifiers NN and FW, wherein said twelfth regular expression pattern is satisfied by an utterance comprising "news" followed by "wire" followed by "for" or "to" or "of";

a thirteenth rule comprising a thirteenth regular expression pattern ([/expense|price|pVe/] [/ratio/]? [/for|to|of/]?) followed by a regular expression pattern identifying a word as a stock name based at least in part on the word satisfying identifiers NN and FW, wherein said thirteenth regular expression pattern is satisfied by an utterance comprising "expense," "price," or "p/e" followed by "ratio" followed by "for" or "to" or "of";

a fourteenth rule comprising a fourteenth regular expression pattern ([/earnings/] [/per/]? [/share/]? [/for|to|of/]?) followed by a regular expression pattern identifying a word as a stock name based at least in part on the word satisfying identifiers NN and FW, wherein said fourteenth regular expression pattern is satisfied by an utterance comprising "earnings" followed by "per" followed by "share" followed by "for" or "to" or "of";

a fifteenth rule comprising a fifteenth regular expression pattern ([/fund/] [/inception/] [/date/] [/for|to|of/]?) followed by a regular expression pattern identifying a word as a stock name based at least in part on the word satisfying identifiers NN and FW, wherein said fifteenth regular expression pattern is satisfied by an utterance comprising "fund" followed by "inception" followed by "date" followed by "for" or "to" or "of";

a sixteenth rule comprising a sixteenth regular expression pattern ([/carbon/] [/footprint/] [/for|to|of/]?) followed by a regular expression pattern identifying a word as a stock name based at least in part on the word satisfying identifiers NN and FW, wherein said sixteenth regular expression pattern is satisfied by an utterance comprising "carbon" followed by "footprint" followed by "for" or "to" or "of";

a seventeenth rule comprising a seventeenth regular expression pattern ([/net/] [/asset/] [/value/] [/for|to|of/]?) followed by a regular expression pattern identifying a word as a stock name based at least in part on the word satisfying identifiers NN and FW, wherein said seventeenth regular expression pattern is satisfied by an utterance comprising "net" followed by "asset" followed by "value" followed by "for" or "to" or "of";

an eighteenth rule comprising an eighteenth regular expression pattern ([quote|chart|trends|doing/]) preceded by a regular expression pattern identifying a word as a stock name based at least in part on the word satisfying identifiers NN and FW, wherein said eighteenth regular expression pattern is satisfied by an utterance comprising "quote," "chart," "trend," or "doing";

a nineteenth rule comprising a nineteenth regular expression pattern ([stock|fund/] [/story/]?) preceded by a regular expression pattern identifying a word as a stock name based at least in part on the word satisfying identifiers NN and FW, wherein said nineteenth regular expression pattern is satisfied by an utterance comprising "stock" or "fund" followed by "story";

a twentieth rule comprising a twentieth regular expression pattern ([stock|fund|quote|chart|trends|impact/] [/for-|to|of/]?) followed by a regular expression pattern identifying a word as a stock name based at least in part on the word satisfying identifiers NN and FW, wherein said twentieth regular expression pattern is satisfied by an utterance comprising "stock," "fund," "quote," "chart," "trends," or "impact" followed by for" or "to" or "of"; and a twenty first rule comprising a twenty first regular expression pattern ([sell|buy|add|remove|short/] [/for|to|of/]?) followed by a regular expression pattern identifying a word as a stock name based at least in part on the word satisfying identifiers NN and FW, wherein said twenty first regular expression pattern is satisfied by an utterance comprising "sell," "buy," "add," "remove," or "short" followed by "for" or "to" or "of"; and wherein:
NN refers to a word that is associated with being a noun; and
FW refers to a foreign word, said foreign word being a word that is not recognized as a word that is part of a native language of the platform.

8. The method of claim 7, wherein one of the pipelines in the set of pipelines is associated with investment requests.

9. The method of claim 7, wherein one of the rule sets comprises a rule for identifying stock names, and said rule comprises identifying a word from the utterance that is a noun as a stock name, wherein a word that is a noun includes a word that is a part of speech other than a noun but is used in a portion of the utterance that is associated with being a noun.

10. The method of claim 7, further comprising an automated telephonic system, wherein the utterance is received via the system user calling in on a telephone to the automated telephonic system, and the response is converted into an audible response that is transmitted by the automated telephonic system to the telephone.

11. The method of claim 7, wherein, when a match is not achieved as a result of the comparison, the platform is further configured to perform a disambiguation, said disambiguation comprising transmitting a query to the system user to make a pipeline selection that is different from the pipeline determined by the platform.

12. The method of claim 7, further comprising a hierarchical multi-tier pipeline architecture, said multi-tier pipeline architecture comprising at least three tiers, wherein the first tier comprises a first pipeline, and each subsequent tier comprises one or more pipelines that are each linked to one pipeline of a tier one level up in the architecture, and wherein the rule set associated with each pipeline comprises all of the rule sets associated with all the pipelines of lower tiers that are linked, directly or indirectly, to said each pipeline.

13. A system with increased processing speed, accuracy, and efficiency for resolving an intent of an utterance, said system comprising:
a processor;
a database storing a plurality of distinct rule sets, each of the rule sets comprising a set of regular expression patterns, and each of the rule sets associated with a different pipeline from a set of pipelines; and
a non-transitory memory storing a set of computer-executable instructions, that, when run on the processor, are configured to:
receive the utterance, said utterance comprising a string of words spoken by a system user via a telephone on a telephone system or a computing device on a computer application, said string of words comprising a user request;
tokenize the utterance via a natural language processing (NLP) engine;
annotate the utterance via the NLP engine;
determine a pipeline from the set of pipelines that is associated with the utterance;
compare the utterance to the rule set that is associated with the determined pipeline;
when a match is achieved between the utterance and a regular expression pattern from the rule set that is associated with the determined pipeline, resolve the intent of the utterance based on the match, said resolved intent corresponding to the user request;
transmit the user request to a central server;
receive a response to the user request from the central server;
when the utterance was spoken by the user on the telephone, convert the response to an audible response; and
transmit the response to the system user;

wherein:
one of the pipelines in the set of pipelines is associated with investment requests;
one of the rule sets comprises a rule for identifying stock names, and said rule comprises identifying a word from the utterance that is a noun as a stock name, wherein a word that is a noun includes a word that is a part of speech other than a noun but is used in a portion of the utterance that is associated with being a noun; and
one of the rule sets comprises:
a first rule comprising a first regular expression pattern ([range|quote|close|open/ ] [/for|of/]?) followed by a regular expression pattern identifying a word as a stock name based at least in part on the word satisfying identifiers NN and FW, wherein said first regular expression pattern is satisfied by an utterance comprising "range," "quote," "close," or "open" followed by "for" or "of";
a second rule comprising a second regular expression pattern ([reports|price/] [/range/]? [/for|of/]?) followed by a regular expression pattern identifying a word as a stock name based at least in part on the word satisfying identifiers NN and FW, wherein said second regular expression pattern is satisfied by an utterance comprising "reports" or "price" followed by "range" followed by "for" or "of";
a third rule comprising a third regular expression pattern ([/sector/] [/for|to/]?) followed by a regular expression pattern identifying a word as a stock name based at least in part on the word satisfying identifiers NN and FW, wherein said third regular expression pattern is satisfied by an utterance comprising "sector" followed by "for" or "to";
a fourth rule comprising a fourth regular expression pattern ([/52-week/] [/range/] [/for|of/]?) followed by a regular expression pattern identifying a word as a stock name based at least in part on the word satisfying identifiers NN and FW, wherein said fourth regular expression pattern is satisfied by an utterance comprising "52-week" followed by "range" followed by "for" or "of";
a fifth rule comprising a fifth regular expression pattern ([/analysts/]) followed by a regular expression pattern identifying a word as a stock name based at least in part on the word satisfying identifiers NN and FW, wherein said fifth regular expression pattern is satisfied by an utterance comprising "analysts";
a sixth rule comprising a sixth regular expression pattern ([/nav/]) followed by a regular expression pattern identifying a word as a stock name based at least in part on the word satisfying identifiers NN and FW, wherein said sixth regular expression pattern is satisfied by an utterance comprising "nay";

a seventh rule comprising a seventh regular expression pattern ([peer|volume|esg|analysts|articles|beta|coverage|dividend|earnings|eps|nav|news|fundamentals|chart|chain/] [/for|to|of/]?) followed by a regular expression pattern identifying a word as a stock name based at least in part on the word satisfying identifiers NN and FW, wherein said seventh regular expression pattern is satisfied by an utterance comprising "peers," "volume," "esg," "analysts," "articles," "beta," "coverage," "dividend," "earnings," "eps," "nav," "news," "fundamentals," "chart," or "chain" followed by "for" or "to" or "of";

an eighth rule comprising an eighth regular expression pattern ([cfra|lipper|morningstar/]? ([/rating|ratings/] [/for|to|of/]?) followed by a regular expression pattern identifying a word as a stock name based at least in part on the word satisfying identifiers NN and FW, wherein said eighth regular expression pattern is satisfied by an utterance comprising "cfra," "lipper," or "morningstar" followed by "rating" or "ratings" followed by "for" or "to" or "of", a ninth rule comprising a ninth regular expression pattern ([/day|day's/] [/'s/]? [/high|low|change/] [/for|to|of/]?) followed by a regular expression pattern identifying a word as a stock name based at least in part on the word satisfying identifiers NN and FW, wherein said ninth regular expression pattern is satisfied by an utterance comprising "day" or "day's" followed by "'s" followed by "high," "low," or "change" followed by "for" or "to" or "of";

a tenth rule comprising a tenth regular expression pattern ([/market/]? [/cap/] [/for|to|of/]?) followed by a regular expression pattern identifying a word as a stock name based at least in part on the word satisfying identifiers NN and FW, wherein said tenth regular expression pattern is satisfied by an utterance comprising "market" followed by "cap" followed by "for" or "to" or "of";

an eleventh rule comprising an eleventh regular expression pattern ([/price/] [/objective/] [/for|to|of/]?) followed by a regular expression pattern identifying a word as a stock name based at least in part on the word satisfying identifiers NN and FW, wherein said eleventh regular expression pattern is satisfied by an utterance comprising "price" followed by "objective" followed by "for" or "to" or "of";

a twelfth rule comprising a twelfth regular expression pattern ([/news/] [/wire/]? [/for|to|of/]?) followed by a regular expression pattern identifying a word as a stock name based at least in part on the word satisfying identifiers NN and FW, wherein said twelfth regular expression pattern is satisfied by an utterance comprising "news" followed by "wire" followed by "for" or "to" or "of";

a thirteenth rule comprising a thirteenth regular expression pattern ([expense|price|pVe/] [/ratio/]? [/for|to|of/]?) followed by a regular expression pattern identifying a word as a stock name based at least in part on the word satisfying identifiers NN and FW, wherein said thirteenth regular expression pattern is satisfied by an utterance comprising "expense," "price," or "p/e" followed by "ratio" followed by "for" or "to" or "of";

a fourteenth rule comprising a fourteenth regular expression pattern ([/earnings/] [/per/]? [/share/]? [/for|to|of/]?) followed by a regular expression pattern identifying a word as a stock name based at least in part on the word satisfying identifiers NN and FW, wherein said fourteenth regular expression pattern is satisfied by an utterance comprising "earnings" followed by "per" followed by "share" followed by "for" or "to" or "of";

a fifteenth rule comprising a fifteenth regular expression pattern ([/fund/] [/inception/] [/date/] [/for|to|of/]?) followed by a regular expression pattern identifying a word as a stock name based at least in part on the word satisfying identifiers NN and FW, wherein said fifteenth regular expression pattern is satisfied by an utterance comprising "fund" followed by "inception" followed by "date" followed by "for" or "to" or "of";

a sixteenth rule comprising a sixteenth regular expression pattern ([/carbon/] [/footprint/] [/for|to|of/]?) followed by a regular expression pattern identifying a word as a stock name based at least in part on the word satisfying identifiers NN and FW, wherein said sixteenth regular expression pattern is satisfied by an utterance comprising "carbon" followed by "footprint" followed by "for" or "to" or "of";

a seventeenth rule comprising a seventeenth regular expression pattern ([/net/] [/asset/] [/value/] [/for|to|of/]?) followed by a regular expression pattern identifying a word as a stock name based at least in part on the word satisfying identifiers NN and FW, wherein said seventeenth regular expression pattern is satisfied by an utterance comprising "net" followed by "asset" followed by "value" followed by "for" or "to" or "of";

an eighteenth rule comprising an eighteenth regular expression pattern ([quote|chart|trends|doing/]) preceded by a regular expression pattern identifying a word as a stock name based at least in part on the word satisfying identifiers NN and FW, wherein said eighteenth regular expression pattern is satisfied by an utterance comprising "quote," "chart," "trend," or "doing";

a nineteenth rule comprising a nineteenth regular expression pattern ([/stock|fund/] [/story/]?) preceded by a regular expression pattern identifying a word as a stock name based at least in part on the word satisfying identifiers NN and FW, wherein said nineteenth regular expression pattern is satisfied by an utterance comprising "stock" or "fund" followed by "story";

a twentieth rule comprising a twentieth regular expression pattern ([stock|fund|quote|chart|trends|impact/] [/for|to|of/]?) followed by a regular expression pattern identifying a word as a stock name based at least in part on the word satisfying identifiers NN and FW, wherein said twentieth regular expression pattern is satisfied by an utterance comprising "stock," "fund," "quote," "chart," "trends," or "impact" followed by for" or "to" or "of"; and a twenty first rule comprising a twenty first regular expression pattern ([sell|buy|add|remove|short/] [/for|to|of/]?) followed by a regular expression pattern identifying a word as a stock name based at least in part on the word satisfying identifiers NN and FW, wherein said twenty first regular expression pattern is satisfied by an utterance comprising "sell," "buy," "add," "remove," or "short" followed by "for" or "to" or "of"; and wherein:
  NN refers to a word that is associated with being a noun; and
  FW refers to a foreign word, said foreign word being a word that is not recognized as a word that is part of a native language of the platform.

14. The system of claim 13 wherein, when a match is not achieved as a result of the comparison, the platform is further configured to perform a disambiguation, said disambiguation comprising transmitting a query to the system user to make a pipeline selection that is different from the pipeline determined by the platform.

15. The system of claim 14, further comprising a hierarchical multi-tier pipeline architecture, said multi-tier pipeline architecture comprising at least three tiers, wherein the first tier comprises a first pipeline, and each subsequent tier comprises one or more pipelines that are each linked to one pipeline of a tier one level up in the architecture, and wherein the rule set associated with each pipeline comprises all of the rule sets associated with all the pipelines of lower tiers that are linked, directly or indirectly, to said each pipeline.

* * * * *